L. E. WATERMAN.
POWER LIFT PLOW.
APPLICATION FILED APR. 19, 1913.
1,072,678.
Patented Sept. 9, 1913.
2 SHEETS—SHEET 1.
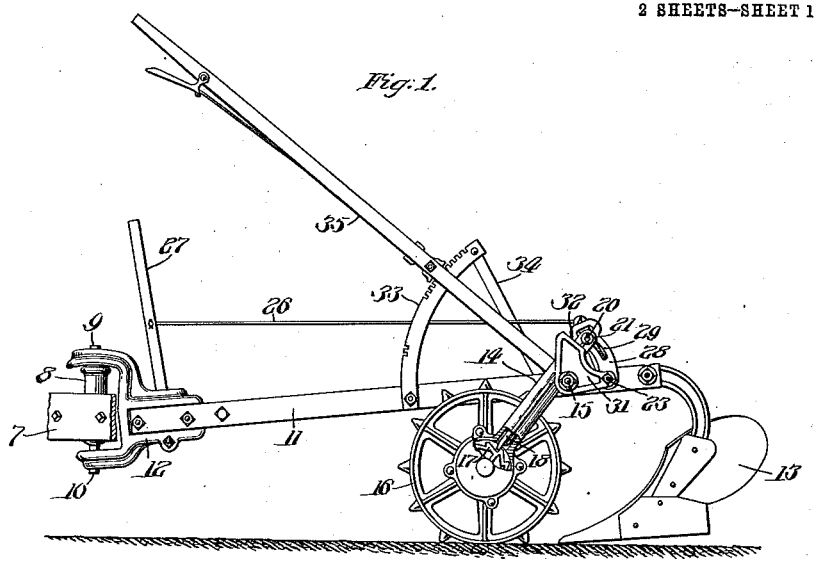
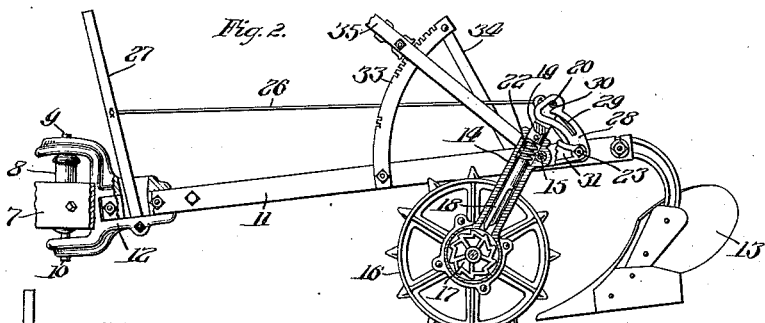
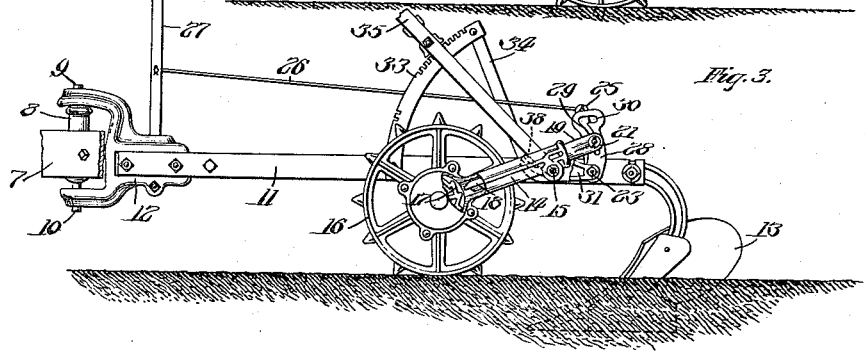

L. E. WATERMAN.
POWER LIFT PLOW.
APPLICATION FILED APR. 19, 1913.
1,072,678.
Patented Sept. 9, 1913.
2 SHEETS—SHEET 2.
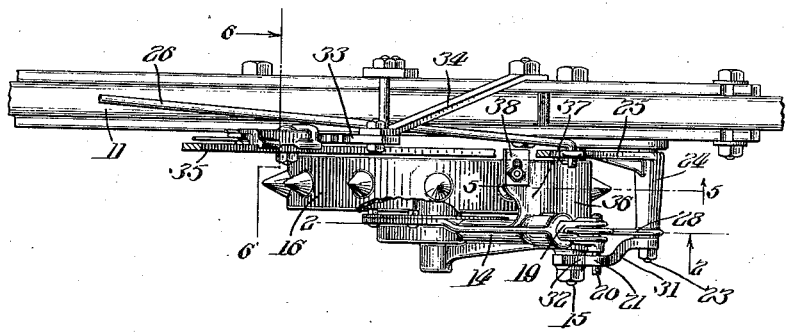
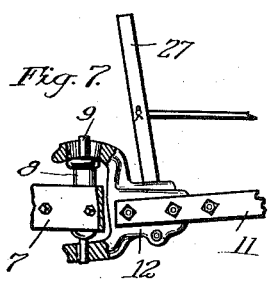
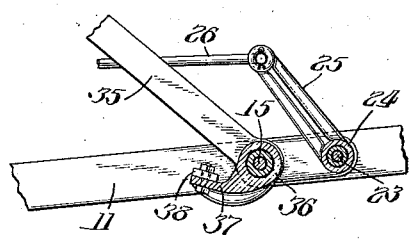
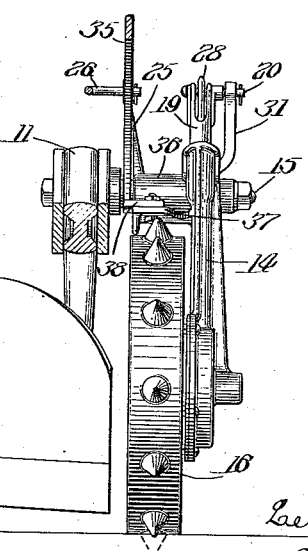

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

POWER-LIFT PLOW.

1,072,678. Specification of Letters Patent. Patented Sept. 9, 1913.

Original application filed May 27, 1912, Serial No. 700,042. Divided and this application filed April 19, 1913. Serial No. 762,384.

*To all whom it may concern:*

Be it known that I, LEWIS E. WATERMAN, a citizen of the United States, residing at Rockford, in the county of Winnebago and State of Illinois, have invented certain new and useful Improvements in Power-Lift Plows, of which the following is a specification.

This invention relates to power lifts for plows and is a division of my patent application for plows, No. 700,042, filed May 27, 1912.

The object of this invention is to construct a power-lift for plows in which independent means are carried by a plow beam for raising and lowering the beam.

The further object is to construct such means that shall be co-active as between the carrying-wheel for the beam, and the beam itself, and in which the traction of the carrying-wheel will raise the beam.

The further object is to construct the raising and lowering means having connection with a carrying-wheel for the beam, in which locking the carrying-wheel from forward movement actuates the raising means and elevates the beam.

In the accompanying drawings, Figure 1 is a side elevation of my improved power-lift plow showing the plow in the act of being raised. Fig. 2 is a similar view showing the plow in its raised position, the wheel-support being shown in section as on line 2—2 of Fig. 4. Fig. 3 illustrates the plow in its lowered working position. Fig. 4 is a plan view of the plow beam in a raised position, the plow not being shown. Fig. 5 is a detail section on the line 5—5 of Fig. 4. Fig. 6 is a transverse vertical view of the plow and lift as taken on the line of section 6—6 of Fig. 4. Fig. 7 is a detail view showing the pivotal support of a plow beam.

The main carrying-frame 7 is adapted to be power driven and to draw a plurality of plows if so desired, and carries a bracket 8 having the vertical upper and lower rigid studs 9 and 10, respectively. The plow beam 11 has bolted to its forward end a yoked bracket 12, the lower arm of the bracket receiving the stud 10 and the upper arm having an elongated slot adapted to receive the stud 9. The plow 13 is connected to the rear end of the beam 11.

The wheel-support 14 is pivotally connected to the beam 11 by the bolt 15, and a traction and supporting-wheel 16 is rotatably carried by the wheel-support. The lower end of the support 14 is in the form of a a recessed casing, within which is located a ratchet-wheel 17 that rotates with the wheel 16. The support 14 is tubular and carries a slidable dog 18 having an enlarged head 19 formed with a bifurcated end carrying a pin 20, upon one end of which is mounted a roller 21, the dog 18 being adapted to be brought into and out of engagement with the ratchet-wheel 17, and held out of such engagement by the coiled spring 22 engaging the head 19 of the dog.

A bolt 23 is secured to the beam 11 and carries a sleeve 24, the sleeve carrying at one end an arm 25 which has a connection by the rod 26, with a hand-lever 27 pivoted to the bracket 12, and at the other end an irregular shaped arm 28 which has formed therein, the cam-groove 29 formed with an offset 30. Said pin 20 is located in the cam-groove 29.

The bracket 31 is rigidly carried by the bolts 15 and 23, and has a cam face 32 with which the roller 21 is adapted to contact as hereinafter described, when the plow is being raised.

The toothed segment 33, braced by link 34, is rigidly carried by the beam 11, and the hand lever 35 which is pivotally supported by the bolt 10, carries a dog which engages said toothed segment.

The sleeve extension 36 of the wheel-support has formed therewith a projecting lug 37 upon which is bolted a stop 38 lying in the path of lever 35 and which can be moved from said path to allow (when shipping) the lever to be swung close to the beam.

The operation of the raising and lowering action of the plow is as follows. With the plow elevated as in Fig. 2, by moving the hand lever 27 backward, the cam-grooved arm 28 is moved backward through means of rod 26 and arm 25, which movement causes the pin 20 to be carried from the offset 30 into the groove 29, thus allowing the beam and plow to fall by their weight, the wheel 16 being brought forward by such movement until the stop 38 contacts the lever 35 which limits the lowered position of the plow. The plow can be raised either by traction force or by manual force. When raising by traction force the lever 27 is moved forward, swinging the cam-grooved arm 21 forward, this action of the cam-grooved arm causing through its engagement with the pin 20, the dog 18 to be brought into engagement with the ratchet-wheel 16. As the plow moves forward the wheel 16 is held stationary because of said dog engagement, and the plow is lifted out of the ground by the wheel-support being pivoted at 15, and the draft through the beam 11 effecting the raising of the plow. As the wheel-support is being thus pivoted, and just as it reaches its raised position, the roller 21 carried by pin 20 will contact the cam face 32, thereby disengaging the dog 18 from the ratchet-wheel, whence the upward spring action exerted by spring 22 on said dog, will further raise the dog until the pin 20 rests in the offset 30 in the cam-groove 29, thus holding the beam in its raised position. When raising the plow manually, the lever 35 is in contact with catch 38 as shown dotted in Fig. 3, and upon moving the lever down, the wheel-support will be pivoted until the pin 20 engages the offset 30 in the cam-groove, this action of holding the beam elevated being the same as in the traction lift.

I claim as my invention.

1. The combination of a frame, a plow beam connected to the frame and capable of a vertical movement, a support pivoted to the plow beam, a wheel mounted on the support and having a clutch wheel rotatable therewith, a dog movable longitudinally on the support to engage the clutch wheel fixedly with the support, and operable means carried by the beam for moving the dog in said movement and for holding the dog locked out of said engageable position thereof, when the support has been moved to its raised position.

2. The combination of a plow beam, a support connected to the beam and movable relative thereto to move the beam to a raised and lowered position, a wheel rotatable on the support, a dog movable to engage the wheel fixedly with the support, an actuable cam in connection with the plow beam to hold the dog in a locked position with the wheel free to rotate, and to hold the plow beam in a raised position locked with the said support.

3. The combination of a frame, a vertically movable plow beam connected thereto, a wheel support connected to the beam and movable vertically relative thereto, a wheel for the support, and raising and lowering mechanism coöperable with the beam and support, including a member movable to engage the wheel fixedly with the support, and means for moving said member and for locking same out of the said engageable position of the wheel and support.

4. The combination of a frame, a vertically movable plow beam connected thereto, a wheel support connected to the beam and movable vertically relative thereto, a wheel for the support, and raising and lowering mechanism coöperating with the beam and support, including a member movable to engage the wheel fixedly with the support, and means for locking said member out of said engageable position and for locking the beam, when the beam is raised, with the support.

5. The combination with a plow beam and a movable wheel support connected thereto, of a wheel for the support, and means coöperating with the beam and support for moving the beam to a raised and lowered position, including, a dog movable to engage the wheel fixedly with the support, and means for actuating said dog and for holding the dog locked out of its position to engage the wheel and support.

6. The combination of a plow beam and a movable wheel support connected thereto, of a wheel for the support, a member movable to engage the wheel and support so that they will move together, and means for holding the beam and support locked with the beam in its raised position and simultaneously holding said member locked out of its said position to engage the wheel and support so that they move together.

7. The combination with a plow beam and a wheel support pivotally connected thereto, of a wheel for the support, a dog movable longitudinally upon the support to engage the wheel fixedly with the support, movable means connected to the beam including a guideway held in operable relation with the dog and along which the dog moves upon movement of the support relative to the beam, and means for actuating said guideway to operate the dog and engage the wheel fixedly with the support.

8. The combination of a frame, a plow beam connected to the frame and capable of vertical movement, a wheel for the plow beam, a support for the wheel pivoted to the plow beam, a ratchet-wheel movable with said wheel, a dog movable longitudinally on said support into and out of engagement with the ratchet-wheel and having one end extending beyond the pivot end of the support, and actuable means in connection with the plow beam for coöperating with said extended end of the dog to control said movements of the dog with the ratchet-wheel.

9. The combination of a frame, a plow beam connected to the frame and capable of a vertical movement, a wheel for the plow beam, a support for the wheel pivotally connected to the plow beam, a clutch wheel carried by the wheel and movable therewith, a member movable longitudinally on said support to coöperate with said clutch wheel, and actuable means in connection with the plow beam to coöperate with said movable member and control the movements thereof.

10. The combination with a plow beam and a wheel support pivotally connected thereto, a wheel for the support, a dog movable longitudinally on the support to engage the wheel fixedly with the support, and operable means in connection with the plow beam for imparting said longitudinal movement to the dog.

11. The combination of a frame, a plow beam pivotally connected to the frame and capable of a vertical movement, a wheel for the plow beam supporting a ratchet-wheel, a support for the wheel pivoted to the beam, a dog movable in the support into and out of engagement with the ratchet-wheel, a rocking arm formed with a groove having an offset, and a pin supported by the dog and located in the groove.

12. The combination of a frame, a plow beam pivotally connected to the frame and capable of a vertical movement, a wheel for the plow beam supporting a ratchet-wheel, a support for the wheel pivoted to the beam, a dog slidable longitudinally in the support into and out of engagement with the ratchet-wheel, actuating means having connection with the dog for holding it out of engagement with the ratchet-wheel, and means for releasing said actuating means from said connection with the dog.

13. The combination of a frame, a plow beam pivotally connected to the frame and capable of a vertical movement, a wheel for the plow beam supporting a ratchet-wheel, a support for the wheel pivoted to the beam, a dog movable in the support into and out of engagement with the ratchet-wheel, a rocking arm formed with a groove having an offset, a pin supported by the dog and located in the groove, and a cam surface with which the dog engages to withdraw the dog from engagement with the ratchet wheel.

14. The combination of a frame, a plow beam pivotally connected to the frame and capable of a vertical movement, a wheel for the plow beam supporting a ratchet-wheel, a support for the wheel pivoted to the beam, a dog movable in the support into and out of engagement with the ratchet-wheel, a rocking arm formed with a groove having an offset, a pin supported by the dog and located in the groove, and a spring for forcing the pin into the offset of the groove.

15. The combination of a frame, a plow beam pivotally connected to the frame and capable of a vertical movement, a wheel for the plow beam supporting a ratchet-wheel, a support for the wheel pivoted to the beam, a dog movable in the support into and out of engagement with the ratchet-wheel, a rocking arm formed with a groove having an offset, a pin supported by the dog and located in the groove and carrying a roller, and a cam surface with which the roller engages to withdraw the dog from engagement with the ratchet-wheel.

In testimony whereof I have hereunto set my hand in presence of two subscribing witnesses.

LEWIS E. WATERMAN.

Witnesses:
JOHN F. McCANNA, Jr.,
E. D. E. N. BEHEL.